(12) United States Patent
Sato et al.

(10) Patent No.: US 7,278,314 B2
(45) Date of Patent: Oct. 9, 2007

(54) OBSTACLE DETECTION SYSTEM

(75) Inventors: Yoshihisa Sato, Nagoya (JP);
Masakazu Takeichi, Okazaki (JP);
Hiroyuki Kani, Okazaki (JP)

(73) Assignee: Denso Corporation, Kariya-city (JP)

( * ) Notice: Subject to any disclaimer, the term of this patent is extended or adjusted under 35 U.S.C. 154(b) by 0 days.

(21) Appl. No.: 11/169,580

(22) Filed: Jun. 30, 2005

(65) Prior Publication Data
US 2006/0016262 A1    Jan. 26, 2006

(30) Foreign Application Priority Data
Jul. 20, 2004  (JP)  ............................ 2004-211752
Apr. 21, 2005  (JP)  ............................ 2005-124065

(51) Int. Cl.
G01N 29/00    (2006.01)
B62D 1/00     (2006.01)

(52) U.S. Cl. ........................... 73/602; 73/628; 73/579; 180/167

(58) Field of Classification Search ................. 73/579, 73/596–600, 625, 626, 602, 628; 367/7, 367/11, 138; 701/1, 300; 340/435, 505, 340/903; 180/167
See application file for complete search history.

(56) References Cited

U.S. PATENT DOCUMENTS

| 4,534,221 A * | 8/1985 | Fife et al. ...................... 73/626 |
| 5,079,751 A | 1/1992 | Woodward |
| 6,221,016 B1 * | 4/2001 | Hayakawa ................... 600/443 |
| 6,629,926 B1 | 10/2003 | Finger et al. |
| 6,670,686 B2 | 12/2003 | Jaouen et al. |
| 6,897,768 B2 | 5/2005 | Sato et al. |
| 6,929,609 B2 * | 8/2005 | Asafusa ....................... 600/439 |
| 7,038,285 B2 | 5/2006 | Jaouen et al. |
| 2003/0034883 A1 | 2/2003 | Sato et al. |
| 2003/0052355 A1 | 3/2003 | Jaouen et al. |
| 2006/0001113 A1 | 1/2006 | Jaouen et al. |

FOREIGN PATENT DOCUMENTS

| DE | 32 06 916 | 7/1983 |
| JP | A-H10-104345 | 4/1998 |
| JP | A-2002-107451 | 4/2002 |
| JP | A-2004-85223 | 3/2004 |
| WO | WO96/04589 | 2/1996 |

OTHER PUBLICATIONS

Office Action issued from European Patent Office issued on Sep. 11, 2005 for the corresponding European patent application No. 2005014899.8 (a copy thereof).
Office Action issued by Chinese Patent Office for the corresponding Chinese application No. 200510086012.1 issued on Mar. 16, 2007 (a copy thereof).

* cited by examiner

Primary Examiner—Helen Kwok
(74) Attorney, Agent, or Firm—Posz Law Group, PLC

(57) ABSTRACT

A plurality of ultrasonic sensors is provided in both front and rear bumpers of a vehicle to detect obstacles around the vehicle. Each sensor sets up a transmission frequency of an ultrasonic pulse signal that should be set up in a frequency adjustment circuit and a center frequency in filter processing in a filter circuit in response to a frequency setting frame transmitted from an EMU. The EMU stores a combination of the transmission frequency and the center frequency for each ultrasonic sensor.

13 Claims, 4 Drawing Sheets

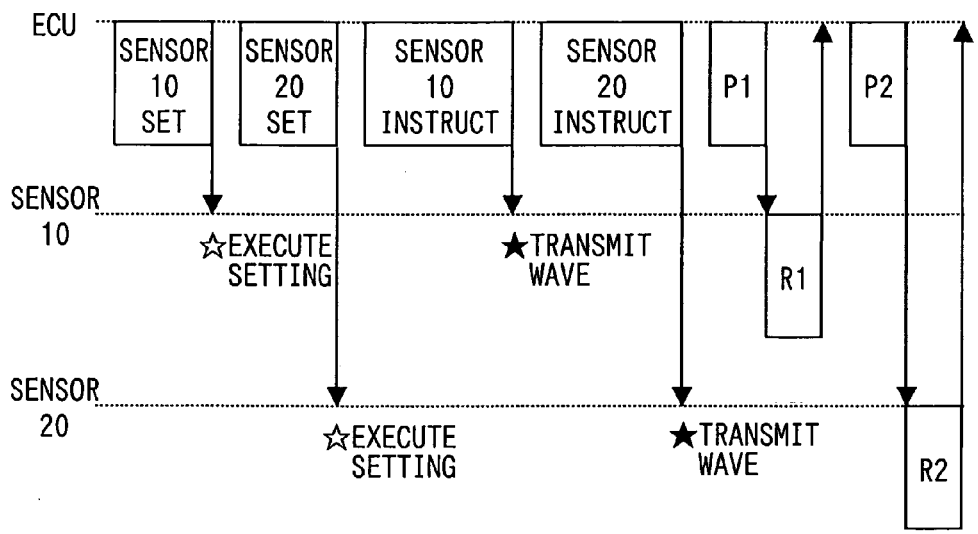

OBSTACLE DETECTION SYSTEM

CROSS REFERENCE TO RELATED APPLICATION

This application is based on and incorporates herein by reference Japanese Patent Applications No. 2004-211752 filed on Jul. 20, 2004 and No. 2005-124065 filed on Apr. 21, 2005.

FIELD OF THE INVENTION

The present invention relates to an obstacle detection system for vehicles.

BACKGROUND OF THE INVENTION

Conventionally, an obstacle detection system that smoothes out dispersion in the oscillation frequency of a microphone used for an ultrasonic sensor is proposed in, for example, US2003/0034883 A1 (JP 3521892 B2). In this obstacle detection system, first a microphone is assembled in a sensor circuit board, and then an obstacle for a test is disposed against the microphone. Subsequently, the obstacle detection system transmits an ultrasonic wave to this obstacle, finds an oscillation frequency of the ultrasonic wave that has a highest peak voltage of its reflected wave, and stores the oscillation frequency in a nonvolatile memory.

In detecting an obstacle actually, an ultrasonic wave of the oscillation frequency stored in this nonvolatile memory is transmitted, whereby the dispersion in the oscillation frequency of the microphone is smoothed out. Therefore, a stringent specification to the microphone becomes unnecessary.

Generally, the ultrasonic sensor is equipped with a filter circuit that filters signals of the reflected wave and eliminates frequency components that deviate from the resonance frequency of the microphone. The center frequency of this filter circuit can be set up in advance based on a resonance frequency that is determined simply by nominal specification without considering the dispersion in the specification of the microphone. For example, when the resonance frequency of the microphone is 40 kHz, the center frequency is set up in advance based on that value.

In contrast to this, in a case where specifications of the microphones are completely different, for example, there exist a plurality of specifications regarding the resonance frequency of the microphone, such as 40, 50 and 60 kHz, it is necessary to prepare filter circuits corresponding to respective specifications.

That is, when an ultrasonic sensor is installed on a vehicle and used to detect obstacles existing in the surroundings of the vehicle, it is desired to alter a detection range and a detection span of the ultrasonic sensor according to the type of a vehicle, installation positions, etc. Therefore, it is necessary to use microphones having different specifications from one another for respective purposes.

Thus, when microphones having different specifications are used, it is necessary to prepare special filter circuits each corresponding to the specification of each microphone. The hardware including the filter circuit therefore lacks general versatility.

SUMMARY OF THE INVENTION

The present invention has an object of providing an obstacle detection system that has high general versatility.

According to an obstacle detection system of the present invention, a transmission frequency of an ultrasonic signal for each of ultrasonic sensors and a center frequency in filtering processing of a received reflected signal are determined according to frequency setting information transmitted from a control unit. As a result, even when several microphones used in the ultrasonic sensor have completely different specifications, hardware of the ultrasonic sensors except for microphones can be common. This is because it is possible to alter the settings of the transmission frequency of the ultrasonic signal and the center frequency in the filtering processing by changing the setting information transmitted to each sensor.

BRIEF DESCRIPTION OF THE DRAWINGS

The above and other objects, features and advantages of the present invention will become more apparent from the following detailed description made with reference to the accompanying drawings. In the drawings:

FIG. 4A shows a format of a frequency setting frame that contains only either a transmission frequency or a center frequency, and FIG. 4B shows a format of a frequency setting frame that contains both the transmission frequency and the center frequency;

FIG. 5 is a timing chart showing a communication sequence in the embodiment;

FIG. 6 is a correspondence table showing correlation between the transmission frequency and the center frequency in the embodiment.

DETAILED DESCRIPTION OF THE PREFERRED EMBODIMENT

Figure 1:
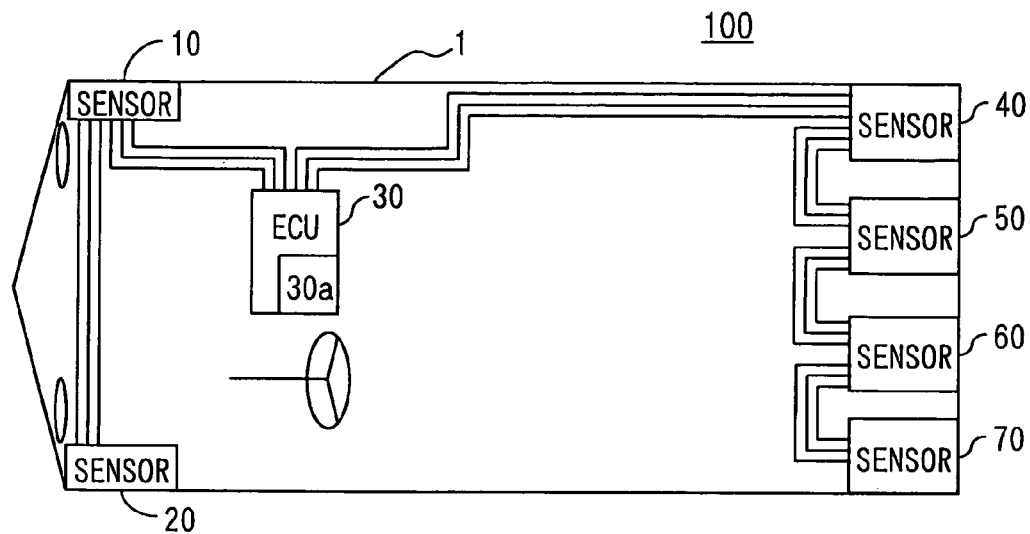
FIG. 1 is a block diagram showing a vehicular obstacle detection system according to an embodiment of the present invention.

Referring to FIG. 1, an obstacle detection system 100 for a vehicle 1 has sensors 10 and 20 arranged at right and left corners on a front bumper part of a vehicle 1; sensors 40 to 70 arranged at right and left corners and a center part on a rear bumper part of the vehicle; and an electronic control unit (EMU) 30. The sensors 10 to 70 are bus-connected to the EMU 30 through serial communication lines. The sensors 10 to 70 transmit ultrasonic waves in the front direction and in the rear direction of the vehicle 1 and receive reflected waves reflected by an obstacle (not shown).

Figure 2A:
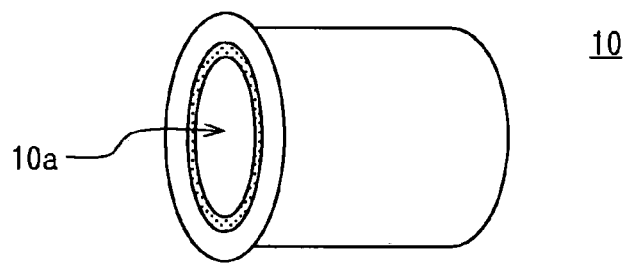
FIG. 2A is a perspective view showing a sensor.
Figure 2B:
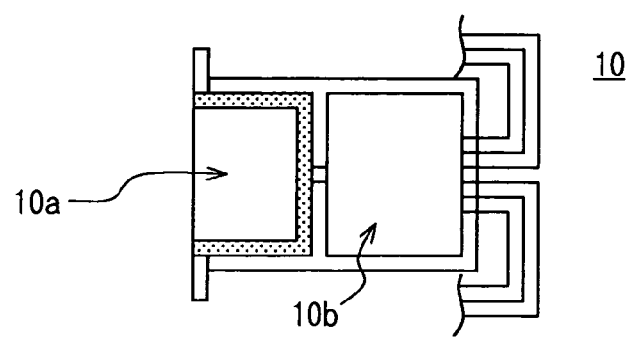
FIG. 2B is a cross sectional view of the sensor in the embodiment.

The sensor 10 may be constructed with a microphone 10a and an electronic circuit unit 10b as shown in FIGS. 2A and 2B. Other sensors 20 to 70 may be constructed similarly to the sensor 10.

The EMU 30 has a nonvolatile memory 30a. This nonvolatile memory stores sensor IDS corresponding to the sensors 10 to 70 and the correspondence table shown in FIG. 6.

The EMU 30 performs processing of transmitting various communication frames, such as a frequency setting frame as frequency setting information, transmission instructing frames each for instructing the sensors 10 to 70 to transmit an ultrasonic wave, and polling frames each for instructing the sensor 10 to 70 to transmit measured distance information, to the sensors 10 to 70 through the serial communication lines.

Among these frames, a format of the frequency setting frame is composed of, as shown in FIG. 4A, fields of a sensor ID, a massage ID, a transmission frequency, and a filter center frequency, and an error check code (ETC.).

Either of IDS assigned to the respective sensors 10 to 70 is set up in the field of sensor ID, and the sensors 10 to 70 determine whether the pertinent information is for itself by referring to this field.

One of IDS assigned for various respective communication frames is set up in the field of message ID, and the sensors 10 to 70 determine a type of the communication frame by referring to this field.

When the field of message ID contains an ID corresponding to the frequency setting frame, in fields that follow the field of message ID, the transmission frequency of an ultrasonic signal that should be set up in the sensors 10 to 70 and the center frequency that should be set up in the filtering processing in a receiving filter circuit 15 are set up. The sensors 10 to 70 determine the transmission frequencies and the center frequencies by referring to this field.

The transmission frequency and the center frequency that are set in this frequency setting frame are selected based on the correspondence table shown in FIG. 6. That is, the EMU 30 (memory 30a) stores a code type (codes 1 to 6) that shows the correlation between the transmission frequency and the center frequency that should be set up for each of the sensors 10 to 70. This code type corresponds to a specification of a transmission-reception microphone (for example, resonance frequency etc.) Used in the sensors 10 to 70.

The EMU 30 selects the transmission frequency and the center frequency according to the specification of the microphone 10a used for the sensors 10 to 70, based on the correspondence table shown in this FIG. 6. The transmission frequency of each frequency level may be correlated with the center frequency. However, even if the transmission frequency and the center frequency do not coincide exactly with each other, frequency components that deviate from the resonance frequency of the microphone 10a can be eliminated sufficiently.

Therefore, by correlating each of the groups (a 39-41 kHz group and a 42-44 kHz group shown in FIG. 6), each of which is composed of a plurality of transmission frequencies having respective different frequency levels to each center frequency having a different frequency level, the need to alter the setting of the center frequency is eliminated, provided that the setting of the transmission frequency is altered within its group.

Figure 3:
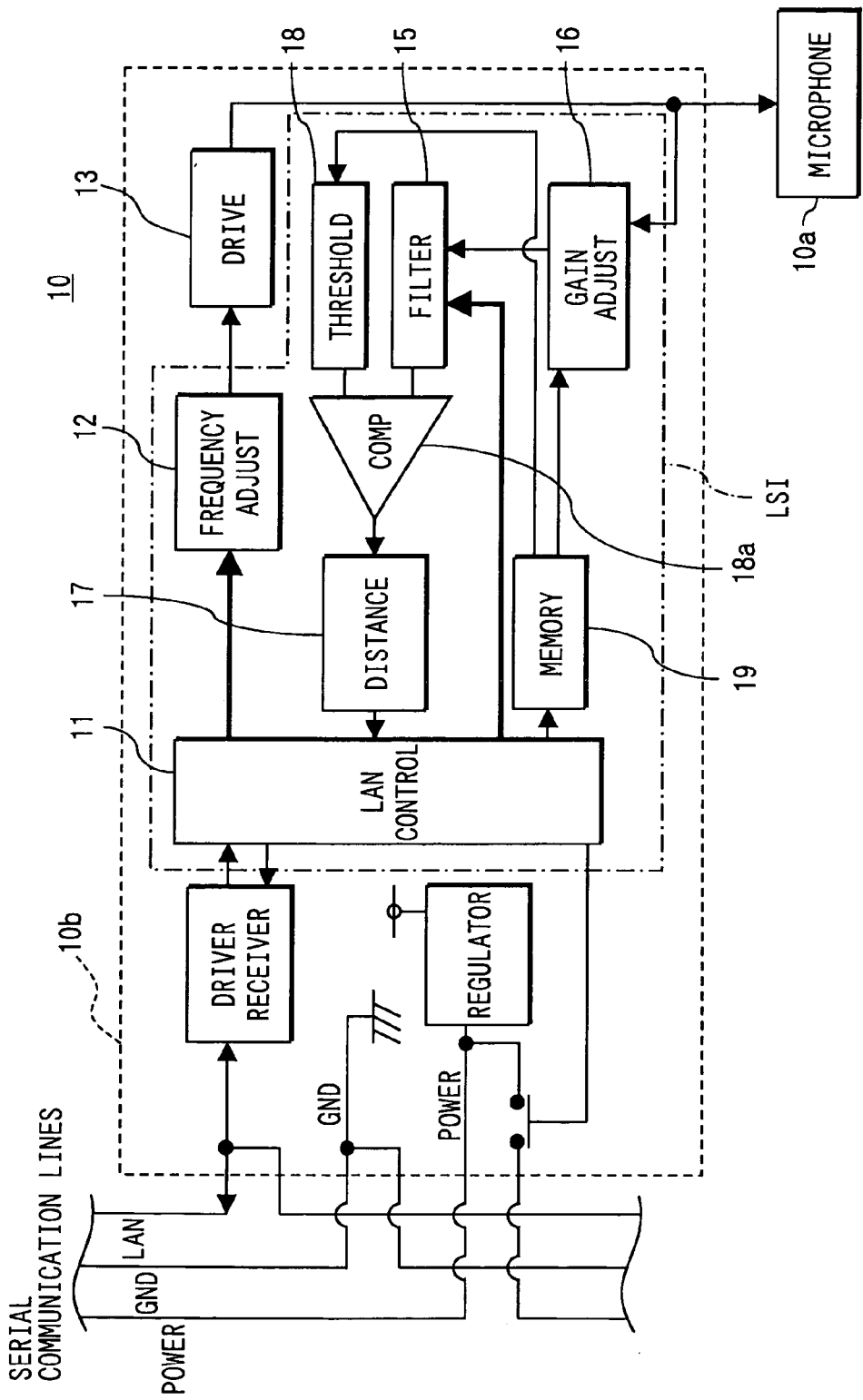
FIG. 3 is a block diagram showing an internal circuit of the sensor in the embodiment.

As shown in FIG. 3, the circuit unit 10b of the sensor 10 has a LAN control circuit 11, a frequency adjustment circuit 12, a microphone driver circuit 13, a filter circuit 15, a gain adjustment circuit 16, a distance calculation circuit 17, a threshold adjustment circuit 18, a comparator 18a, and a nonvolatile memory 19.

The LAN control circuit 11, the frequency adjustment circuit 12, the filter circuit 15, the gain adjustment circuit 16, the distance calculation circuit 17, the threshold adjustment circuit 18, the comparator 18a and the memory 19 are constructed integrally with one another in a LEI (Large-Scale Integrated circuit). By this construction, even when a specification of the microphone 10a is completely different from others, the LEI that constitutes hardware except for the microphone driver circuit 13, the microphone 10a, etc. Can be used commonly among the sensors 10 to 70.

The LAN control circuit 11 receives various communication frames transmitted from the EMU 30 through the serial communication lines and also transmits a polling frame for transmitting back measured distance data. In addition, the sensor 10 decodes contents of a communication frame with the control circuit 11.

The frequency adjustment circuit 12 sets up (adjusts) a transmission frequency that is to be set up in the frequency setting frame transmitted from the EMU 30 as a transmission frequency of an ultrasonic pulse signal, and transmits the ultrasonic pulse signal of this set-up transmission frequency to the microphone driver circuit 13.

The microphone driver circuit 13 drives the microphone 10a with the ultrasonic pulse signal from the frequency adjustment circuit 12, and, thereby, an ultrasonic wave is transmitted from the microphone 10a. If this transmitted ultrasonic wave is reflected by an obstacle, its reflected wave is received by the microphone 10a and that received signal is outputted to the gain adjustment circuit 16. The gain adjustment circuit 16, referring to the gain stored in the memory 19, amplifies the received signal by a predetermined factor, and outputs the received signal after amplification to the filter circuit 15.

The filter circuit 15 is equipped with a filter circuit for eliminating frequency components that are out of a resonant frequency of the microphone 10a by performing the filtering processing to a received signal amplified in the gain adjustment circuit 16. This filter circuit 15 is composed of a well-known switched capacitor filter (SC) circuit.

By this configuration, a filter circuit capable of altering its center frequency in filter processing can be realized with an LEI. In the filter circuit 15, the center frequency is set up to in the frequency setting frame transmitted from the EMU 30 as a center frequency in the filter processing.

The received signal subjected to the filter processing by this filter circuit 15 is outputted to the comparator 18a. The comparator 18a compares a threshold voltage level for obstacle determination being set up by the threshold adjustment circuit 18 and the level of the received signal. When the comparator 18a determines that the received signal is larger than the threshold, the distance calculation circuit 17 converts a time in starting transmission of an ultrasonic wave and receiving its reflected wave into a distance to the object, and outputs a distance data to the LAN control circuit 11.

Next, operations from settling of the transmission frequency and the center frequency to acquisition of distance calculation results in the vehicular obstacle detection system 100 will be described using a timing chart showing a communication sequence shown in FIG. 5. This description is made with respect to only sensors 10 and 20 arranged in the front part of the vehicle 1. Other sensors 40 to 70 arranged in the rear part of the vehicle 1 are operated similarly to the sensors 10 and 20.

First, the EMU 30 is started to operate when an ignition switch (not shown) is turned on and it receives power supply from an in-vehicle battery (not shown). When the EMU 30 is started, it performs processing for setting up the sensor IDS for the respective sensors 10 and 20.

When setting of the sensor IDS is completed, the EMU 30 transmits a frequency setting frame to the sensor 10. The sensor 10 decodes this frequency setting frame and executes setting of the transmission frequency and the center frequency.

Subsequently, the EMU 30 transmits the frequency setting frame to the sensor 20. Then, the sensor 20 decodes this frequency setting frame, and executes setting of the transmission frequency and the center frequency.

Next, the EMU 30 transmits the wave transmission instruction frame for indicating transmission of an ultrasonic signal to the sensor 10. The sensor 10 transmits an ultrasonic wave in response to this wave transmission instruction frame. After transmitting the wave transmission instruction frame to this sensor 10, the EMU 30 transmits the wave transmission instruction frame to the sensor 20 after setting an ample time for it to be free from an influence of multi-pass. The sensor 20 transmits an ultrasonic wave in response to this wave transmission instruction frame.

Then, the EMU 30 transmits the polling frame (P1) for instructing transmission of measured (ranged) distance information to the sensor 10, and the sensor 10 transmits back the polling frame (R1) for transmitting back the measured distance data to the EMU 30.

Moreover, the EMU 30 transmits a polling frame (P2) for instructing transmission of the measured distance information to the sensor 20, and the sensor 20 transmits back a polling frame (R2) For transmitting the measured distance data to the EMU 30. After this, EMU 30 repeatedly transmits the wave transmission instruction frames and the polling frames, and thereby detects an obstacle.

In this way, the sensors 10 to 70 in the vehicular obstacle detection system 100 set up the transmission frequency of the ultrasonic pulse signal and the center frequency in the filter processing in response to the frequency setting frame from the EMU 30.

Even when specifications of the microphones used in the sensors 10 to 70 are completely different from one another, it is possible to alter the setting of the transmission frequency of the ultrasonic pulse signal and the center frequency in the filter processing according to the specifications. Therefore the hardware of the sensors 10 to 70 except for the microphone driver circuit 13 and the microphone 10*a* can be used commonly and the general versatility of the hardware is increased. As a result, higher efficiency can be attained in each process of design, manufacture, and management of the hardware of the sensors 10 to 70.

In the above embodiment, both of the transmission frequency and the center frequency are set up individually. In the ultrasonic signal transmitter part 12, this transmission frequency being set up is set up as the transmission frequency of the ultrasonic pulse signal. In the receiving filter part 15, this center frequency is set up as the center frequency in the filtering processing.

Alternatively, the frequency setting up may be modified as follows: only one of the transmission frequency and the center frequency is set up in the frequency setting frame. When the frequency setting frame contains only the center frequency, the ultrasonic signal transmitter part 12 sets up that center frequency as the transmission frequency. When the frequency setting frame contains only the transmission frequency, the receiving filter part 15 sets up that transmission frequency as the center frequency.

By making the EMU 30 set up only either the transmission frequency or the center frequency in the frequency setting frame and making the sensors 10 to 70 set up the transmission frequency and the center frequency in a coupled manner as described above, data length of a communication frame can be shortened. Moreover, decoding of the communication frame becomes easy also in the sensors 10 and 20.

In the above embodiment, the EMU 30 starts to operate by being supplied with power from the vehicle-mounted battery when the ignition switch (BIG) of the vehicle is turned on, and subsequently transmits a frequency setting frame. This processing is performed each time the BIG is turned on.

Figure 7:
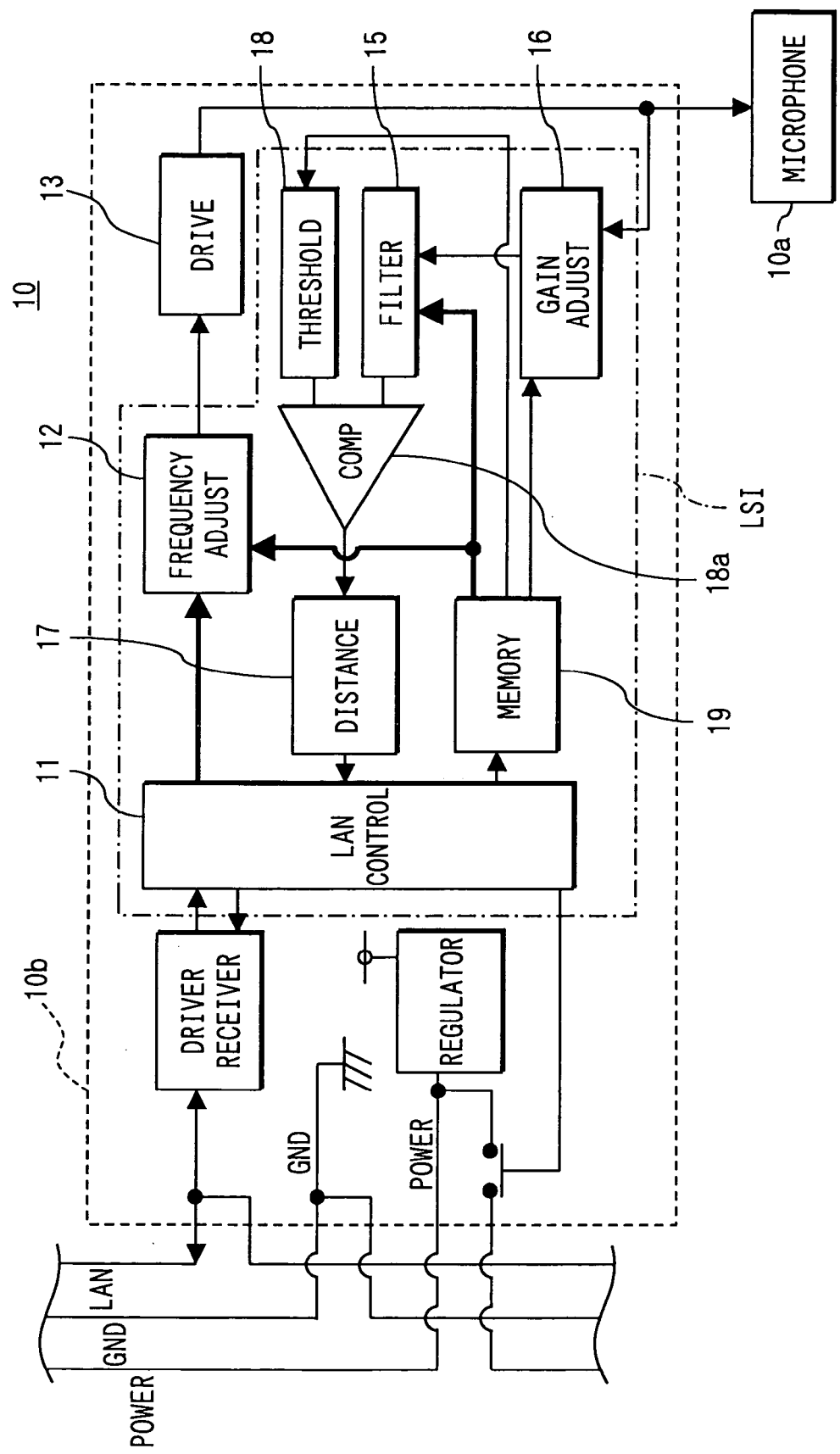
FIG. 7 is a block diagram showing an internal circuit of the sensor according to a modification of the embodiment.

Alternatively, as shown in FIG. 7, the system 100 may be configured in such a way that a transmission frequency and a center frequency to be set up in the frequency setting frame may be stored in the memory 19 of the LEI.

This scheme eliminates the need to transmit the frequency setting frame from the EMU 30 each time the IC is set on after its manufacture by storing the transmission frequency and the center frequency in the memory 19, for example, at the time of manufacture of the sensors 10 and 20.

What is claimed is:

1. An obstacle detection system comprising:
a plurality of ultrasonic sensors, wherein each ultrasonic sensor has ultrasonic signal transmitting means for transmitting an ultrasonic signal, wave transmitting and receiving means for transmitting an ultrasonic wave responsive to the ultrasonic signal and receiving reflected wave, and receiving filtering means for performing filtering processing on the received wave of the ultrasonic signal; and
a control unit communicable with the plurality of ultrasonic sensors,
wherein the control unit is equipped with processing means for performing processing of transmitting frequency setting information that contains a transmission frequency of the ultrasonic signal and a center frequency in the filtering processing to the ultrasonic sensor, the ultrasonic signal transmitting means has transmission frequency setting means for setting up a transmission frequency of the ultrasonic signal according to the frequency setting information,
wherein the control unit includes a memory storing a combination of transmission frequency and center frequency for each of the plurality of ultrasonic sensors,
wherein the receiving filtering means is equipped with center frequency setting means for setting up a center frequency in the filtering processing according to the frequency setting information.

2. The obstacle detection system according to claim 1, wherein the ultrasonic signal transmitting means and the receiving filtering means are constructed integrally with each other in an LSI.

3. The obstacle detection system according to either claim 1, wherein:
the transmission frequency setting means sets up the center frequency as the transmission frequency when only the center frequency is contained in the frequency setting information; and
the center frequency setting means sets up the transmission frequency as the center frequency when only the transmission frequency is contained in the frequency setting information.

4. The obstacle detection system according to claim 1, wherein:
the processing means selects both of the transmission frequency and the center frequency that should be contained in the frequency setting information based on a correspondence table of the memory showing correlation between the transmission frequency and the center frequency; and
the transmission frequency of each frequency level or each group comprised of a plurality of the transmission frequencies having respective different frequency levels is correlated to the center frequency of a different frequency level in the correspondence table.

5. The obstacle detection system according to claim 1, wherein the receiving filtering means includes a switched capacitor filter circuit.

6. The obstacle detection system according to claim 1, wherein:
   the ultrasonic sensor has storage means for storing the frequency setting information; and
   the transmission frequency setting means and the center frequency setting means set up the transmission frequency and the center frequency, respectively, according to the frequency setting information stored in the storage means.

7. The obstacle detection system according to claim 1, wherein:
   the plurality of ultrasonic sensors are installed on a front bumper part and a rear bumper part of a vehicle.

8. The obstacle detection system according to claim 1, wherein the frequency setting information includes both the transmission frequency and the center frequency, and
   wherein the transmission frequency and the center frequency are set at a same time in each ultrasonic sensor.

9. The obstacle detection system according to claim 1, wherein the center frequency can be different from the transmission frequency.

10. The obstacle detection system according to claim 1, wherein the ultrasonic signal transmitting means uses the transmission frequency in the frequency setting information to set the transmission frequency of the ultrasonic signal.

11. The obstacle detection system according to claim 1, wherein the filtering processing of the receiving filtering means is set to filter the received wave using the center frequency of the frequency selling information.

12. The obstacle detection system according to claim 1, further comprising serial communication lines connecting the control unit and the plurality of ultrasonic sensors, wherein the control unit transmits the frequency setting information to the plurality of ultrasonic sensors through the serial communication lines.

13. The obstacle detection system according to claim 1, wherein the transmitting of the processing means of the control unit further associates the frequency setting information with a unique identification corresponding to the particular ultrasonic sensor that is to use the frequency setting information, and each ultrasonic sensor refers to the unique identification to determine whether to use the associated frequency setting information.

* * * * *